March 14, 1961 W. H. LEWIS 2,974,938
PAVEMENT CUTTING APPARATUS
Original Filed April 17, 1953 6 Sheets-Sheet 1
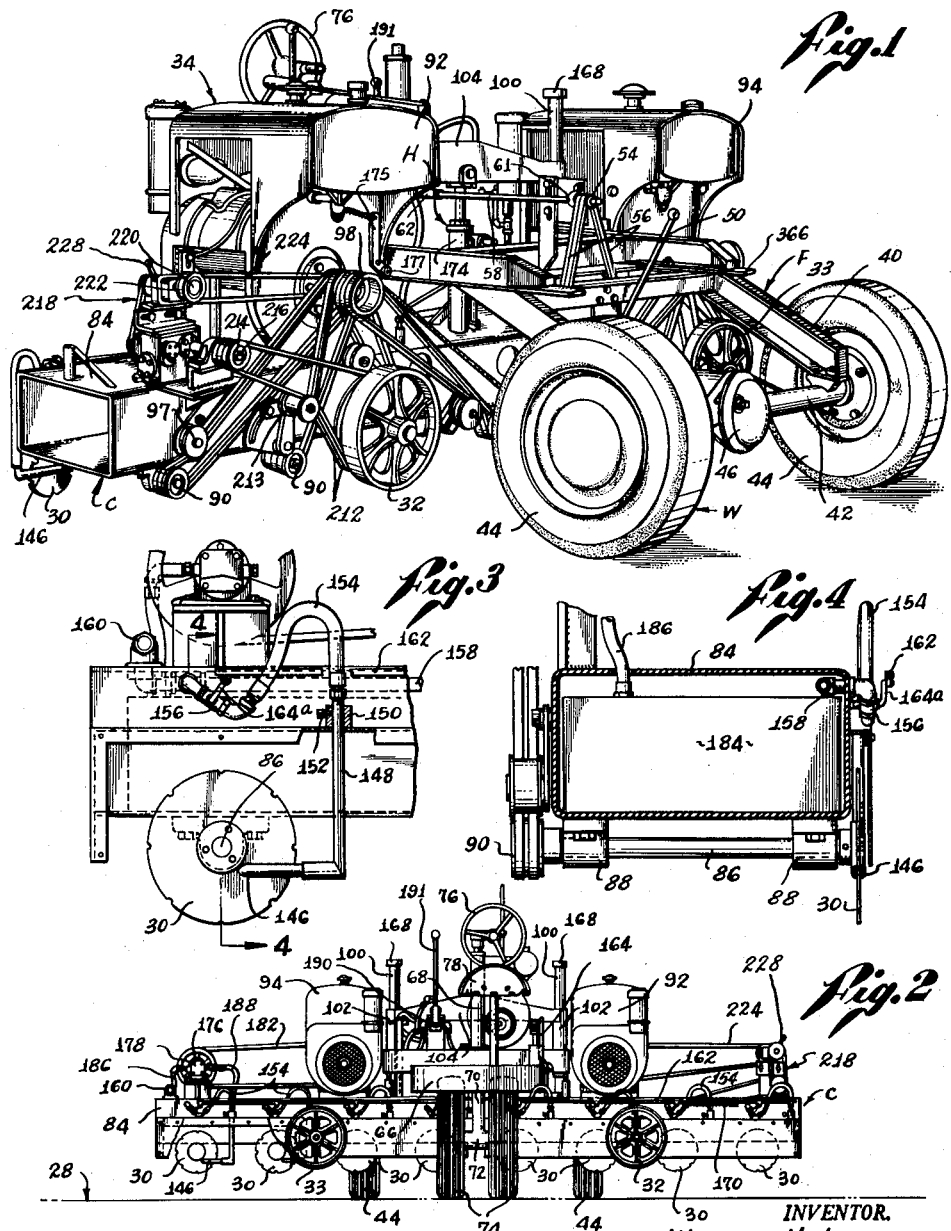
INVENTOR.
WILLIAM H. LEWIS March 14, 1961  W. H. LEWIS  2,974,938
PAVEMENT CUTTING APPARATUS
Original Filed April 17, 1953  6 Sheets-Sheet 2
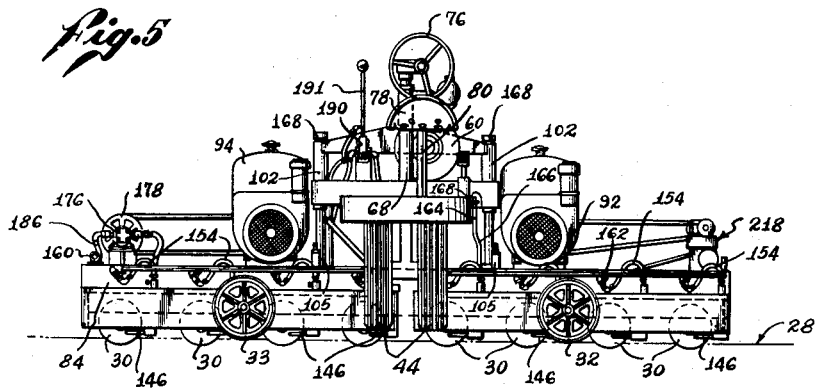
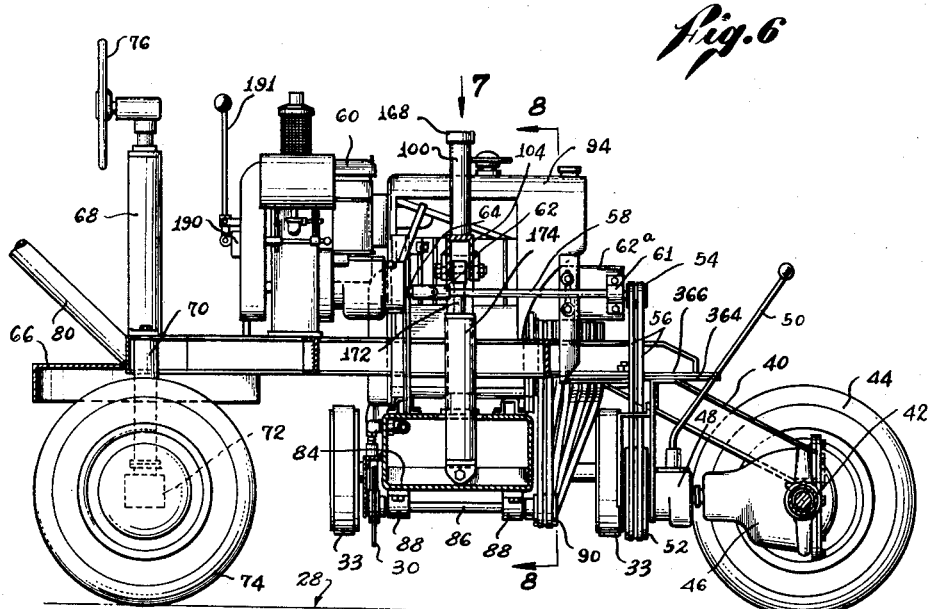
INVENTOR.
WILLIAM H. LEWIS
BY Fulwider, Mattingly & Babcock
Attorneys March 14, 1961 W. H. LEWIS 2,974,938
PAVEMENT CUTTING APPARATUS
Original Filed April 17, 1953 6 Sheets-Sheet 3

INVENTOR.
WILLIAM H. LEWIS
BY
Zulwider, Mattingly & Babcock
Attorneys

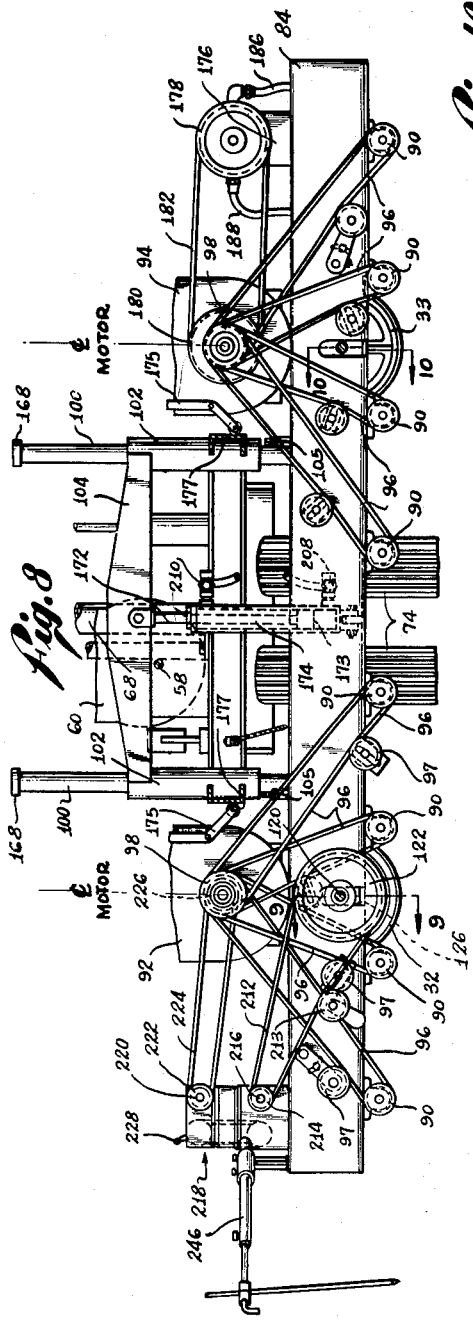
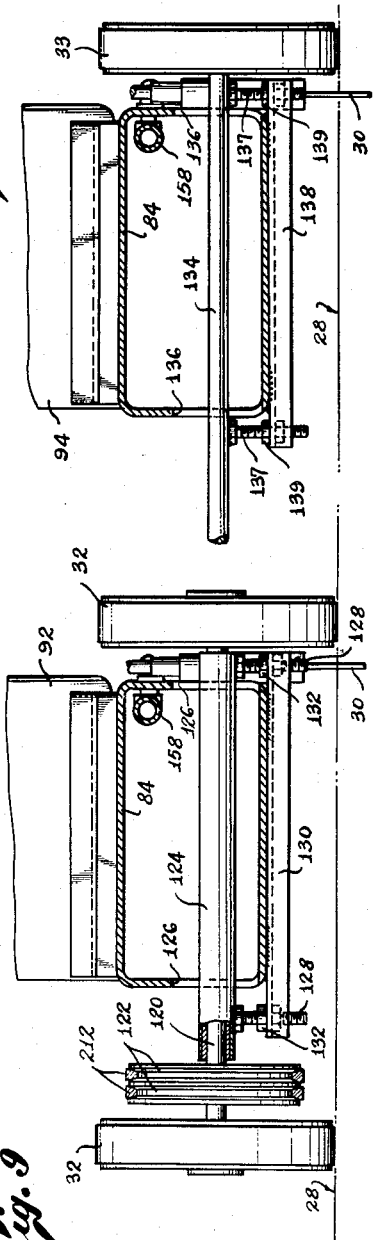

March 14, 1961 W. H. LEWIS 2,974,938
PAVEMENT CUTTING APPARATUS
Original Filed April 17, 1953 6 Sheets-Sheet 5
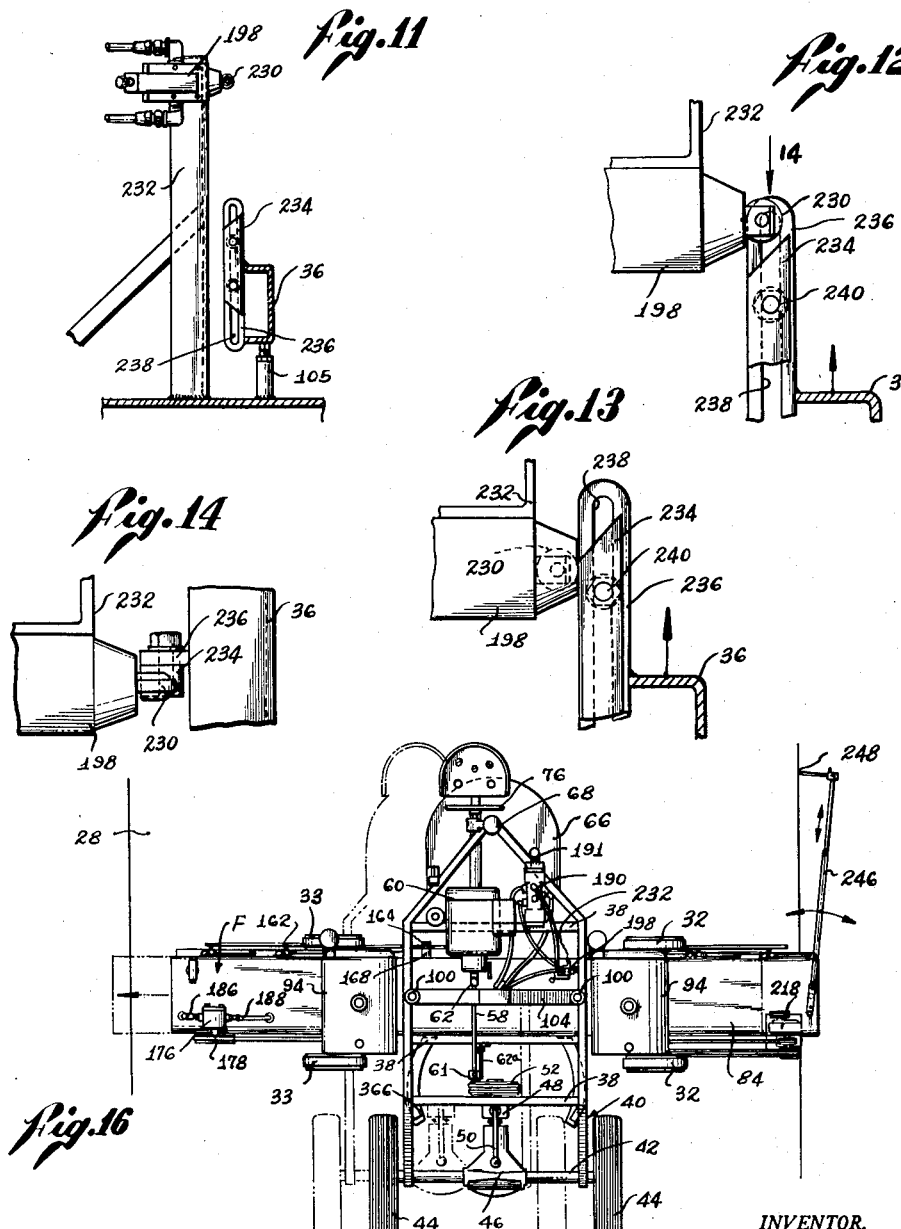
INVENTOR.
WILLIAM H. LEWIS
BY
Fulwider, Mattingly & Babcock
Attorneys

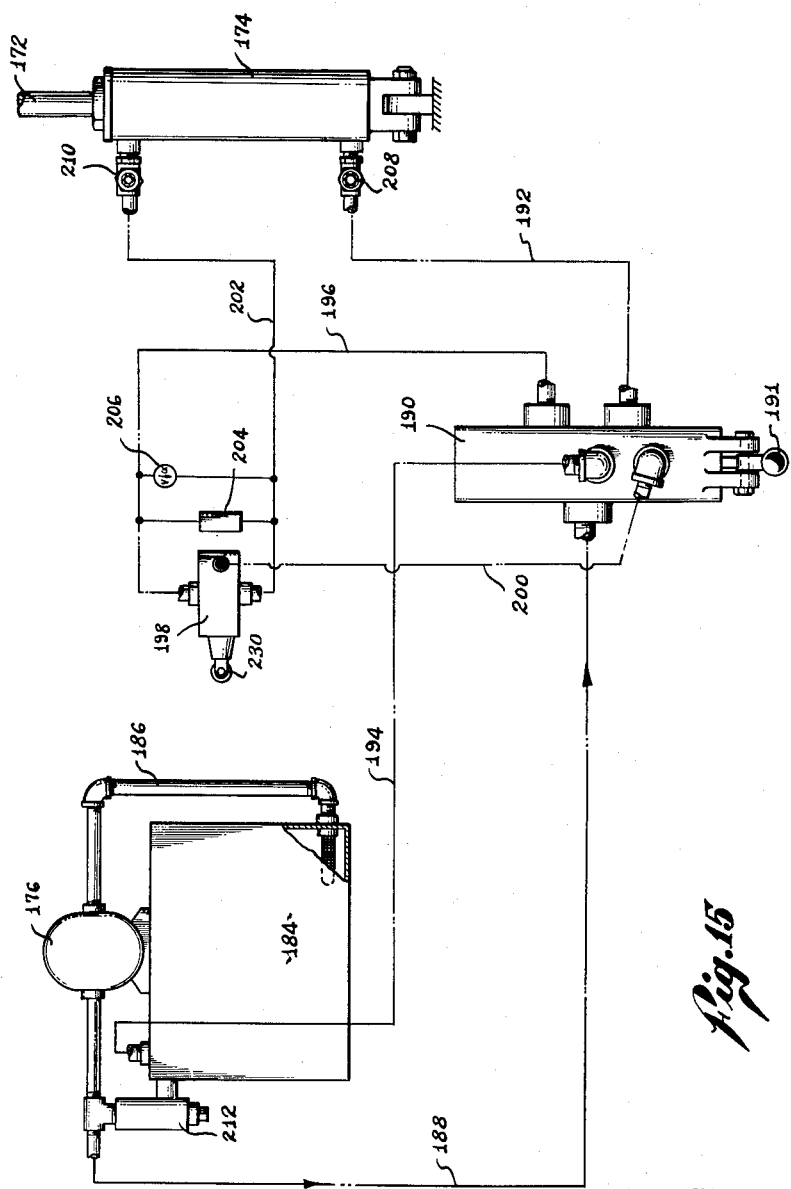

United States Patent Office 2,974,938
Patented Mar. 14, 1961

2,974,938

PAVEMENT CUTTING APPARATUS

William H. Lewis, Arcadia, Calif., assignor, by mesne assignments, to Joint Saw Company, Arcadia, Calif., a corporation of California Original application Apr. 17, 1953, Ser. No. 349,418, now Patent No. 2,782,017, dated Feb. 19, 1957. Divided and this application Oct. 1, 1956, Ser. No. 613,319

13 Claims. (Cl. 262—20)

The present invention relates generally to pavement cutting apparatus, and more particularly to apparatus for cutting slots or kerfs in a paved surface.

This is a division of my application Serial No. 349,418, filed April 17, 1953, now Patent No. 2,782,017 issued February 19, 1957.

In the construction of paved roads, driveways, airport runways, and the like, it is customary after laying the pavement to tamp transversely extending separator strips at longitudinally spaced points in the wet paving material. The purpose of these separator strips is to define weakened plane joints in the paving material; contraction of the paving material as it hardens causing it to crack at each of the weakened plane joints. If such weakened plane joints were not provided, the pavement would be damaged by the uncontrolled cracking which would otherwise occur during its contraction.

The use of these separator strips has met with considerable dissatisfaction because the pavement finishing machine which follows the tamping equipment used to insert the separator strips in the pavement often deforms these strips, producing a joint which weaves transversely across the pavement. Additionally, should the separator strip be tamped too low, the passage of the finisher over these strips may induce spalling of the upper portion of the pavement with a resultant ragged joint.

In order to avoid the disadvantages involved in the use of such separator strips it has been proposed to machine saw or cut the weakened plane joints. Such machine sawing has heretofore been carried out primarily by means of comparatively small hand operated machines utilizing one or two power-driven cutting discs and adapted to be moved transversely across the highway whereby their cutting discs may saw the kerfs which define the weakened plane joints. Although these machines are generally satisfactory for use in forming the kerfs defining the weakened plane joints of a short section of roadway, they prove unsatisfactory when used to form the weakened plane joints in a comparatively long roadway section. This is true because of the comparatively short period of time within which it is necessary that the weakened plane joints be formed. Such joints cannot be formed in regular continuity as is true in the case of tamping the separator strips. Instead, it is necessary to first form a series of control joints. These control joints insure that initial hardening and consequent contraction of the pavement does not crack the pavement surface. Ordinarily these control joints are formed at approximately sixty-foot intervals. Thereafter, joints may be formed at approximately thirty-foot intervals and then at approximately fifteen-foot intervals. The forming of these weakened plane joints is further complicated by the fact that should the cutting operations commence before the pavement has sufficiently hardened, the cutter disc will pull pebbles out of the pavement instead of cutting through them, leaving the sides of the joints badly spalled. If, however, the pavement is cut after it has hardened to an excessive degree, the rate at which the cutting discs are able to move through the pavement is seriously reduced, and their service life is considerably shortened.

Under these circumstances the disadvantages of utilizing heretofore proposed hand operated pavement cutting machines to form the kerfs defining the weakened plane joints in a long section of roadway will be readily observed. Unless a large number of such machines are provided, it is difficult to form even the sixty-foot spaced control joints before the pavement contracts to a point where it is damaged, and assuming that a comparatively large number of these machines should be employed, it would be difficult to form the thirty and fifteen-foot spaced joints before the pavement has hardened to such a degree that the cutting rate and service life of the cutter disc is seriously reduced. If a sufficient number of these small machines are provided that the kerfs can be sawed within the required period of time, their combined expense to purchase, maintain and operate becomes excessive.

It is a major object of the present invention to provide a single machine for cutting weakened plane joints which may be used in place of a large number of the heretofore proposed small machines.

Another object is to provide a novel pavement cutting apparatus having a frame which is supported for longitudinal movement along an elongate strip of pavement, and a plurality of transversely spaced cutter discs operatively connected to the frame in order that they may be moved transversely across the paved strip so as to form a transversely extending kerf therein at longitudinally spaced points along its length.

It is a further object of the invention to provide pavement cutting apparatus having a plurality of transversely spaced cutter discs which are moved concurrently across a paved strip so as to saw a transversely extending kerf therein.

It is another object to provide pavement cutting apparatus having novel means for supplying its cutter discs with coolant in order that a minimum quantity of coolant will be required for cutting a maximum number of kerfs.

A further object of the invention is to provide pavement cutting apparatus which will not damage the surface of the pavement whereon it is operated.

An additional object is to provide pavement cutting apparatus utilizing cutter discs driven by an internal combustion engine, and having novel means for conserving the amount of fuel required by said engine.

A more particular object of the present invention is to provide novel cutting apparatus which is especially adapted to form kerfs extending diagonally across a paved strip relative to the side edges thereof.

It is another object to provide pavement cutting apparatus capable of cutting a large number of weakened plane joints in a roadway in a minimum amount of time. This permits the road building job to be completed without annoying and costly delays.

These and other objects and advantages of the present invention will become apparent from the following detailed description of a preferred, and of an alternate embodiment thereof, when taken in conjunction with the appended drawings wherein:

Figure 1 is a general perspective view of a preferred form of pavement cutting apparatus embodying the present invention;

Figure 2 is a rear view of said apparatus;

Figure 3 is a fragmentary, enlarged view of a cutter disc mounted by said apparatus;

Figure 4 is a vertical sectional view taken along line 4—4 of Figure 3;

Figure 5 is a rear view of said apparatus during a pavement cutting operation;

Figure 6 is a side view of said apparatus;

Figure 8 is a vertical sectional view taken along line 8—8 of Figure 6;

Figure 9 is an enlarged vertical sectional view taken along line 9—9 of Figure 8;

Figure 10 is an enlarged vertical sectional view taken along line 10—10 of Figure 8;

Figure 11 is a vertical sectional view taken on line 11—11 of Figure 7;

Figure 12 is a fragmentary enlarged vertical sectional view disclosing a detail of certain parts shown in Figure 11, but taken when said parts are disposed in different positions;

Figure 13 is an enlarged vertical sectional view similar to Figure 12 but showing said parts in yet another position;

Figure 14 is a fragmentary top plan view taken from the point indicated in Figure 12;

Figure 15 is a schematic view of the hydraulic system utilized with the preferred form of apparatus; and Figure 16 is a top plan view showing the mode of operation of the preferred form of apparatus.

Figure 7:
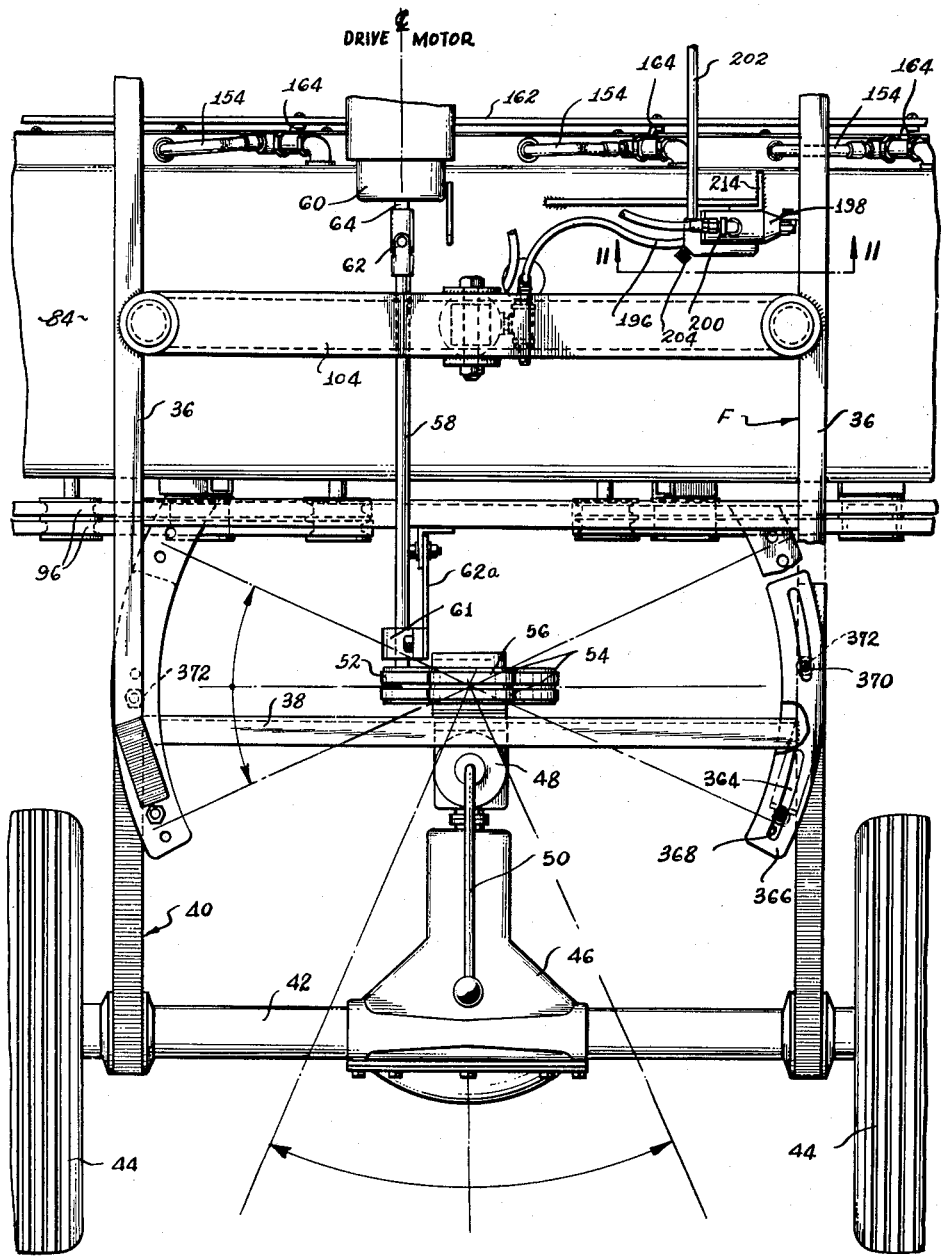
Figure 7 is an enlarged top plan view taken from a point indicated by the numeral 7 in Figure 6.

*General arrangement of the apparatus shown in Figures 1 through 16*

Referring to the drawings, and particularly to Figures 1 through 6 thereof, the preferred embodiment of the present invention broadly comprises a frame F having wheels W supporting it for longitudinal movement along a paved strip 28; a carriage C rotatably mounting a plurality of transversely spaced cutter discs 30, which discs are normally supported above the surface of the paved strip 28 as shown in Figures 1, 2 and 6; and power-actuated means H for effecting relative vertical movement between the frame F and the carriage C. The carriage C mounts auxiliary wheels 32 and 33 having their axes of rotation disposed at approximately right angles to the axes of rotation of the wheels W. In operation, the frame F is moved along the paved strip 28 in a longitudinal direction, stopping at longitudinally spaced points thereon where a slot or kerf K is to be sawed therein. When the longitudinal movement of the frame has been halted, the power-actuated means H moves the carriage C downwardly until the auxiliary wheels 32 and 33 thereof engage the surface of the strip. During such downward movement of the carriage the cutter discs 30 will be brought into engagement with the paving strip prior to the time the auxiliary wheels engage the strip. Further downward movement after the cutter discs have so engaged the paved strip will cause them to be forced downwardly into the pavement material of which the strip is composed. After the auxiliary wheels have been engaged with the paved strip 28, further relative vertical movement between the frame F and the carriage C causes the frame to be moved upwardly so that its wheels M are lifted free of the surface of the paved strip. The entire unit comprising the frame and the carriage is then caused to move transversely across the paved strip by power-operated means, generally designated 34, drivingly connected to the auxiliary wheels 32. During such transverse movement a transversely extending kerf will be cut in the paved strip by the cutter discs 30.

*The frame F*

More particularly, the frame F will preferably comprise a pair of side elements 36 rigidly interconnected by means of transverse spacers 38, which elements and spacers may be channel-shaped in cross-section. Connected to the forward portion of the side elements 36 is a downwardly extending subframe 40. The front end of this subframe 40 mounts the front axle 42, which axle rotatably supports the front wheels 44. These wheels may be of the conventional automotive pneumatic-tired type. The front axle 42 is seen to be divided by a transmission 46, to the rear of which is disposed a gear box 48. From the rear of the gear box 48 extends a shaft (not shown) which is rigidly connected to a pair of pulleys 52. These pulleys 52 are belt-driven by a smaller pair of pulleys 54; a pair of belts 56 being utilized to connect the pulleys 52 and 54. The pulleys 54 are rigidly secured to the front end of a drive shaft 58, which drive shaft is driven by power means such as an air-cooled internal combustion engine 60. A universal joint connection 62 is interposed between the drive shaft 64 of the engine 60 and the drive shaft 58. With this arrangement, motive power from the engine 60 may be transferred to the front wheels 44 so as to effect either forward or rearward motion of the frame F. The gear box 48 provides several speeds both in a forward and a rearward direction. A clutch in the form of a bearing element 61 wherein is journaled the front of the drive shaft 58 may be pivotally mounted to the frame by a lever 62a. With this arrangement the tension of the belts 56 may be varied so as to vary the amount of power transmitted thereby.

The rear portion of the frame side elements 36 extend inwardly and are joined together at their ends. An operator's platform 66 is supported upon this rear portion. At the junction of the frame elements 36 there is rigidly mounted an upstanding tubular column 68. This column 68 coaxially mounts a post 70, the bottom portion of which post is rigidly secured to the mid-portion of rear axle 72. A pair of wheels 74 are mounted at opposite ends of the rear axle. The post 70 is adapted to be rotated by means of a conventional steering wheel assembly 76 mounted at the top of the column 68 whereby the rear wheels 74 may be steered. An operator's seat 78 is supported over the platform 66 by means of an inclined support bar 80; the seat being disposed in such a position that an operator seated thereon will have easy access to the steering wheel 76, as well as other controls to be described hereinafter.

*The carriage*

Referring now to Figures 4, 8, 9 and 10, the carriage C will preferably include a hollow elongated boom 84 of rectangular vertical cross-section. The cutter discs 30 may be of any type suitable for cutting concrete, asphalt, or the like, and they are each rigidly secured to the rear of a shaft 86. The shafts 86 are each rotatably journaled within strap-type bearings 88 rigidly secured to the underside of the boom 84. The front end of each shaft 86 rigidly mounts a pair of pulleys 90. The pulleys 90 are driven by internal combustion engines 92 and 94; the engine 92 driving the pulleys located on its side of the carriage, and the engine 94 driving the pulleys located on the opposite side of the carriage. To this end belts 96 connect the pulleys 90 with pulleys 98, the latter pulleys being keyed to the shafts of the engines 92 and 94. The boom 84 may be connected to the frame F by means of a pair of upstanding columns 100 rigidly mounted as by welding at their lower portions to the boom, which columns are slidably disposed within a pair of tubes 102 for axial movement with respect thereto. The tubes 102 are rigidly secured as by welding at their lower portions to the side elements 36 of the frame F. The upper portion of the tubes 102 are rigidly connected by means of a horizontal cross-bar 104. With this arrangement, the columns 100 may slide axially within the tubes 102 whereby the carriage is vertically reciprocable relative to the frame. The height to which the carriage rises may be controlled by adjustment bolts 105.

With further reference to Figures 8, 9 and 10, only one of the pairs of the auxiliary wheels 32 and 33 are power driven, which pair 32 appears at the left of the carriage in Figure 8 and are shown in detail in Figure 9. The power driven wheels 32 are each keyed to opposite ends of a horizontal shaft 120. A pair of pulleys 122 are also keyed to the shaft 120. The shaft 120 is concentrically disposed within a cylinder 124 for rotation relative thereto, which cylinder is mounted within slots 126 formed at the front and the rear of the boom 84. The opposite ends of the cylinder 124 rigidly mount depending stud bolts 128, which bolts extend through bores formed in the opposite ends of a cross-piece 130. The cross-piece 130 is rigidly secured, as by welding, to the underside of the boom 84. The stud bolts 128 are secured to the cross-piece 130 by means of adjusting nuts 132. The wheels 32 are adapted to be driven by the engine 92 in a manner to be fully set forth hereinafter.

Referring now to Figure 10, the other pair of auxiliary wheels 33 are independently rotatably mounted at the opposite ends of a horizontal shaft 134, which shaft is disposed within slots 136 formed in the boom 84. The opposite sides of the shaft 136 rigidly mount a pair of downwardly extending stud bolts 137 similar to those shown in Figure 9, which stud bolts are secured by means of adjusting nuts 139 to a cross-piece 138 welded to the underside of the boom 84. It will be apparent that adjustment of the depth of the kerf K may be accomplished by manipulation of the adjusting nuts 132 and 139. Preferably, the auxiliary wheels will mount tires of solid rubber.

*Arrangement for supplying coolant to the cutter discs*

Referring now to Figures 3 and 4, it is desirable that a coolant such as water be supplied to the cutter discs 30 during the actual pavement cutting operation. To this end, each cutter disc may be provided with a nozzle 146. These nozzles 146 are shown mounted by an L-shaped pipe 148 having its upper end secured within a collar 150, as by a bolt 152. The upper end of each pipe 148 is connected to one end of a hose 154. The opposite end of this hose 154 is connected to a control valve 156. The opposite end of the control valve 156 is attached to a common conduit 158 which is in communication with each of the other control valves 156. The common conduit 158 is connectable with a source of water by means of a fitting 160. This source of water may conveniently comprise a truck-mounted tank (not shown), which truck may be driven alongside the paved strip 28 in conjunction with the described apparatus. Alternately, a suitable tank may be mounted upon the frame or the carriage of the described apparatus, or may be pulled behind said apparatus as it moves along the paved strip 28. The flow of water through each control valve 156 is controlled by a horizontal rod 162, slidably mounted upon the rear of the carriage. This rod 162 is pivotally connected to levers 164a extending from each of the control valves 156. With this arrangement, horizontal movement of the rod 162 in one direction will open all of the control valves 156, while movement of this rod in the opposite direction will close all of these control valves.

It should be particularly noted that the present invention provides novel means for cutting off the flow of coolant to the cutting discs 30 when the latter are not actually engaged with the paved strip 28. This is an important feature, inasmuch as it avoids possible dilution of the freshly laid pavement and it reduces the amount of coolant which must be transported along the paved strip. As shown in Figures 2 and 5, this novel means includes a rigid upstanding cam rod 164 secured at its lower end to the horizontal rod 162 as by welding. The cam rod 164 is formed at its intermediate portion with an off-set section 166. During vertical movement of the carriage relative to the frame, the cam rod 164 reciprocates vertically relative to an encompassing lug 168a shown rigidly secured to one side of the operator's platform 66. As clearly shown in Figure 2, when the carriage C is in its elevated position the horizontal rod 162 is biased to the left by a helical tension spring 170. At this time the control valves 156 will be closed. When the carriage is moved downwardly, however, the offset section 166 of the cam rod will engage the sides of the lug 168a so as to cam the rod 164 and hence the horizontal rod 162 to the right in Figures 2 and 5. Such movement will in turn cause the control valves 156 to be opened whereby coolant may flow through nozzles 146 onto the cutting disc 130. It has been found desirable to so proportion the cam rod 164 that the control valves are opened when the lower edges of the cutter disc are disposed about one inch above the surface of the paved strip 28.

*The power-actuated means H*

Referring now to Figures 1 and 8, the preferred form of power-actuated means H for effecting relative vertical movement between the frame F and the carriage C includes a vertical rod 172 pivotally secured at its upper end to the mid-portion of the cross-bar 104 and rigidly connected at its lower end to a piston 173, and a hydraulic cylinder 174 wherein the piston 173 is reciprocally disposed. The lower end of this cylinder 174 may be pivotally secured to the center of the carriage boom 84. The hydraulic cylinder 174 is adapted to receive hydraulic fluid under pressure so as to effect vertical reciprocation of the piston 173 and hence of the rod 172 respective to the cylinder 174. This reciprocation will cause concurrent relative vertical movement between the frame and the carriage. The cylinder 174 is adapted to receive hydraulic fluid under pressure from a pump 176 shown in Figure 8 as being mounted on the right side of the boom 84. This pump 176 is belt-driven from the internal combustion engine 94; the shaft of the pump being keyed to a pulley 178 which is aligned with a complementary pulley 180 keyed to the shaft of the engine. Pulleys 178 and 180 are connected by a belt 182. The pump 176 is supplied with hydraulic fluid from a suitable reservoir 184 shown mounted within the boom 84 underneath the pump, the reservoir being connected to the pump intake by a conduit 186. The pump outlet is connected to another conduit 188.

With particular reference to Figure 15, in the preferred form of hydraulic system, the outlet conduit 188 is connected with a main controller valve 190 having an operating handle 191. From the main controller valve a conduit 192 extends to the bottom of the cylinder 174, a return conduit 194 extends to the reservoir 184, another conduit 196 extends to one side of a cam-operated throttling valve 198. A conduit 202 connects the opposite side of the throttling valve 198 with the top of the cylinder 174. The conduits 196 and 202 are interconnected by an orifice valve 204 and a one-way check valve 206. A restrictor valve 208 is interposed between the lower end of the cylinder 174 and the conduit 192, and a similar restrictor valve 210 is interposed between the upper end of this cylinder and the conduit 202. These restrictor valves are so constructed that they permit unhampered flow of fluid into the cylinder, but flow out of the cylinder is restricted to a desired rate. A pressure relief valve 212 is disposed between the pump outlet and the reservoir 184. The throttling valve 198 and the main controller valve 190 may be connected by a bleed line 200. The operation of this hydraulic system is fully set forth hereinafter.

*The arrangement for driving auxiliary wheels 32*

As mentioned hereinbefore with reference to Figure 9, the shaft 120 mounting the auxiliary wheels 32 is keyed to a pair of pulleys 122. Referring again to Figure 8, it will be seen that these pulleys 122 are connected by belts 212 to a pair of pulleys 214 keyed to the outlet shaft 216 of a clutch member generally designated 218. The tension of belts 212 may be controlled by idler pulleys 213. The input shaft 220 of this clutch member 218 rigidly mounts a pair of pulleys 222 which are connected by belts 224 to a pair of pulleys 226 keyed to the shaft of the internal combustion engine 92. The clutch member 218 is adapted to control the amount of power transmitted to and the rotational speed of the pulleys 214, and hence of the auxiliary wheels 32. This clutch member 218 is adjustable manually by a lever 228.

*Explanation of Figures 11 through 14*

It should be particularly observed that the present invention contemplates novel means for controlling the vertical movement of the carriage C relative to the frame F. Included in such means is the cam-operated throttling valve 198 referred to hereinbefore in connection with the description of Figure 15. This valve is so designed that hydraulic fluid is free to pass through it between conduits 196 and 202 when its wheel 230 is in the extended position shown in Figures 11 and 15. When the wheel 220 is retracted inwardly relative to the main body of the valve, however, flow between conduits 196 and 202 is cut off. When the wheel 230 is disposed intermediately of its fully extended position and fully retracted position, the quantity of fluid passing therethrough will vary in relation to its axial position relative to the main body of the valve.

The throttling valve 198 is rigidly mounted to the upper end of an upright post 232 secured at its lower end to the carriage boom 84. The wheel 230 is adapted to be moved relative to the main body of the valve by contact with a cam plate 234 carried by the frame F. This cam plate 234 is attached to a vertically extending elongated adjustment member 236 rigidly connected as by welding to one of the frame elements 36. To this end, the adjustment member 236 is formed with a slot 238. Vertical adjustment of the cam plate relative to the member 236 is effected by means of the bolt and nut combinations 240. The upper and lower ends of the cam plate 234 are seen to be beveled. It will be apparent that upon relative vertical movement between the frame and carriage, the cam wheel 230 will be moved between its extended and retracted postions by contact with the upper and lower ends of the cam plate 234.

*General operation of the apparatus shown in Figures 1 through 16*

In operation, the apparatus is driven along the paved strip 28 with both engines 92 and 94 in operation and with the carriage C is a raised position to the point where the first kerf is to be formed. Normally, referring to Figure 16, the cutting operation takes place from right to left in plan view. Hence, the cutter disc located at the right end of the carriage must be spotted over the right side of the paved strip at the exact point where the kerf is to be formed with the carriage disposed at right angles to the strip. As an aid in such spotting, a pointer 246 may be mounted at the right portion of the carriage, the free end of which pointer is adapted to be aligned with the right side 248 of the paved strip. Preferably, this pointer 246 will be adjustable as to its effective length and as to the angle it makes with the carriage.

After the apparatus has been properly spotted, with the cutter discs 30 rotating, the operator may move the operating handle 191 of the main controller valve 190 so as to admit hydraulic fluid into the lower part of the cylinder 174. This will urge the carriage C downwardly relative to the frame F whereby first the cutter discs 30 and then the auxiliary wheels 32 and 33 will be engaged with the surface of the paved strip; continued downward movement of the carriage after the cutter discs engage this surface, but before the auxiliary wheels engage it, causing the discs to cut through the strip to the depth of the kerf. Once the auxiliary wheels do engage the paved strip, the frame F will rise relative to the carriage so as to lift the wheels W clear of the paved strip, as shown in Figure 5. Next, the entire assembly will be driven across the paved strip to the left by the auxiliary wheels 32, as indicated by the directional arrow in Figure 16. During this movement the cutter discs will form a transversely extending kerf across the paved strip.

When the assembly has reached the left end of its travel, as indicated by the dotted outline in Figure 16, the operator will move the operating handle 191 of the main controller valve so as to release hydraulic fluid from the lower end of cylinder 174 and admit it to the upper end thereof. This will serve to lower the frame F until its wheels are again engaged with the surface of the paved strip, at which time the carriage C will be raised off the surface to its original position. The frame F may then be driven along the paved strip under the influence of the front wheels 44 to the next point at which a kerf is to be cut. During such movement the operator may control the course followed by the frame by means of the steering mechanism 76.

It should be especially observed that the apparatus embodying the present invention is provided with means for conserving the amount of fuel consumed by the internal combustion engines 92 and 94. Thus, referring to Figure 8, such means includes a cam lever 175 shown pivotally mounted by each of the supports for such engines. The lower end of each of these cam levers carry a roller 177, while the upper ends thereof are connected to the throttles (not shown) of the respective engines. It is anticipated that during the time the carriage C is in its raised position of Figures 1, 2, 6 and 9, the rollers 177 will ride upon the sides of the frame elements 36. At this time the engine throttles will be set in an idling position. When the carriage is lowered into its pavement cutting position of Figure 5, however, the rollers 177 roll off the frame elements 36 and the upper ends of the levers move the engine throttles to an advanced position. With this arrangement, the engines will be permitted to idle when the carriage is in a raised position and will only develop appreciable power during the actual cutting of the pavement.

*Operation of the hydraulic system of Figures 11 through 16*

In the operation of the hydraulic system shown in Figures 11 through 16, assuming the carriage to be disposed in its upper position of Figures 1, 2 and 6, the control lever 191 of the main controller valve 190 will initially be in a neutral position so that fluid from the pump 176 will pass through conduit 188 into the main controller valve and return by means of conduit 194 to the top of the reservoir 184. If the lever 191 is then moved to its first position, fluid flow through the return conduit 194 will be cut off and the fluid from the pump 176 will instead be directed through conduit 192 into the bottom of cylinder 174. This will cause the cylinder 174 to be moved downwardly relative to the piston 123 thereby urging the carriage downwardly relative to the frame. During such movement, fluid trapped between the top of the piston 173 and the upper end of the cylinder 174 must pass through the top restrictor valve 210. The setting of this restrictor valve should be such that the proper rate of fluid flow out of the upper end of the cylinder will be obtained to provide the desired rate of cylinder travel. The fluid passing out of the upper end of the cylinder will flow by means of conduits 202 into one side of the throttling valve 198 and by means of conduit 196 from the other side of the throttling valve to the main controller valve 190. The fluid entering the latter valve will then pass through return conduit 194 to the reservoir 184.

As the carriage moves downwardly, the cam wheel 230 of the throttling valve 198 will contact the beveled upper edge of the cam plate 234 as shown in Figure 12. This contact should take place shortly before the lower edges of the cutter discs 30 engage the surface of the paved strip. Upon continued downward movement of the carriage the cam wheel 230 will roll downwardly over the cam plate until it reaches its retracted position of Figures 13 and 14. At this time all flow of hydraulic fluid through the throttling valve will be blocked and the only flow between conduits 202 and 196 must take place through the orifice valve 204. Since this valve includes an orifice (not shown) of comparatively small diameter, the rate of flow between these conduits is reduced appreciably compared to the rate of flow therebetween which takes place when the throttling valve is opened. In this manner the rate of flow of fluid out of the upper end of the cylinder 174, and hence the speed at which the carriage is being lowered, is reduced to a desired value. Accordingly, the speed at which the cutter discs may saw downwardly into the pavement may be closely controlled. After the cutter discs have cut to the proper depth the auxiliary wheels 32 and 33 will engage the surface of the paved strip 28. At this time the cam wheel 230 will have passed off the lower edge of the cam plate 234 whereby the throttling valve 198 will again be wide open. Accordingly, the frame F may be moved upwardly at a high rate of speed.

When the frame F has been moved to its upper position of Figure 5, the control lever 191 may be moved again to its neutral position. The inward flow of liquid through conduit 192 into the lower end of the cylinder 174 and the outward flow of liquid through conduits 202 and 196 from the upper end of the cylinder will then be cut off, and fluid entering the main controller valve 190 through conduit 188 will be returned to the reservoir 184 by means conduit 194. When it is desired to again lower the frame and raise the carriage, the control lever 191 will be urged to its second position. In this position the flow of liquid through return conduit 194 will be cut off and directed through conduit 196 into one side of the throttling valve 198, and from the other side of this valve into the upper end of the cylinder 174. At the same time the fluid in the cylinder below the piston 173 will be free to return through conduit 192 to the main controller valve 190 and return conduit 194 to the reservoir 184. Thus, the cylinder will be urged upwardly relative to the piston 173, and the frame will in turn be lowered relative to the carriage until its wheels 44 and 74 are again engaged with the surface of the paved strip. At this time the frame will stop its downward movement and the carriage will be lifted upwardly until it reaches its original position of Figures 1, 2 and 6.

It should be particularly noted that even though the throttling valve 198 will be closed by contact of the cam wheel 230 with the cam plate 234 during this latter movement of the frame and carriage to their original positions, the speed at which the frame is lowered and the carriage is lifted is not affected. This is true because of the positioning of the check valve 206 between the conduits 196 and 202, which check valve bypasses both the throttling valve 198 and the orifice valve 204. With this arrangement, even though the throttling valve is closed, the check valve 206 will open so as to bypass fluid between conduits 196 and 202. The capacity of this check valve should be substantially that of the opened throttling valve 198. It should be further noted that the rate at which the cylinder 174 moves relative to the piston 173 is controlled by the setting of the restrictor valves 208 and 210. In this regard, the setting of the two restrictor valves may be so adjusted as to provide substantially the same rate of cylinder speed despite the difference in internal volume between the upper and lower ends of the cylinder; this difference in volume resulting from the presence of the lower portion of the rod 172 in the upper end of the cylinder.

While there has been shown what is at present believed to be the preferred embodiment, it will be apparent to those skilled in the art that various modifications and changes may be made thereto. For example, the number of cutter discs as well as the spacing thereof, may be varied in accordance with the optimum conditions of a particular job. Additionally, the exact number of wheels utilized for supporting the frame or the carriage is subject to change.

I claim:

1. Cutting apparatus for forming a plurality of longitudinally spaced transversely extending kerfs in an elongate strip of pavement, comprising: a frame; main wheels supporting said frame for longitudinal movement relative to said strip, said wheels normally being engaged with said pavement; carriage means mounted by said frame; a plurality of aligned, transversely spaced cutter discs mounted by said carriage means, said discs being normally maintained out of engagement with said pavement; auxiliary wheels mounted by said carriage means permitting it to be moved transversely relative to said strip, said auxiliary wheels normally being disposed above said pavement; means for effecting relative vertical separation of said frame and said carriage means in order that said carriage wheels and said cutter discs may be brought into engagement with said pavement and said main wheels will be lifted off said pavement; and, means for moving said carriage means transversely relative to said strip whereby said cutter means may cut a transversely extending kerf in said strip.

2. Cutting apparatus for forming a plurality of longitudinally spaced transversely extending kerfs in an elongate strip of pavement, comprising: a frame; main wheels mounted by said frame and normally engaged with said pavement in order that said frame may be moved in a longitudinal direction therealong; a carriage mounted by said frame; a plurality of aligned, transversely spaced cutter discs rotatably mounted by said carriage, said discs normally being disposed out of engagement with said pavement; auxiliary wheels mounted on said carriage permitting it to be moved transversely relative to said strip, said auxiliary wheels normally being disposed above said pavement; means for effecting relative vertical separation of said frame and said carriage in order that said auxiliary wheels and said discs will be brought into engagement with said pavement and said main wheels will be lifted off of said pavement; and, means for driving at least one of said auxiliary wheels whereby said frame and said carriage may be moved transversely across said strip, said discs cutting a transversely extending kerf therein during such movement.

3. Cutting apparatus for forming a plurality of longitudinally spaced transversely extending kerfs in an elongate strip of pavement, comprising: a frame; main wheels mounted by said frame and normally engaged with said pavement in order that said frame may be moved in a longitudinal direction therealong; a carriage mounted by said frame; a plurality of aligned, transversely spaced cutter discs rotatably mounted by said carriage, said discs normally being disposed out of engagement with said pavement; power-operated means for rotating said discs; auxiliary wheels mounted by said carriage permitting it to be moved transversely relative to said strip, said auxiliary wheels normally being disposed above said pavement; means for effecting relative vertical separation of said frame and said carriage in order that said auxiliary wheels and said discs may be brought into engagement with said pavement and said main wheels will be lifted off of said pavement; means responsive to the relative vertical position of said frame and said carriage for controlling the speed of said power-operated means; and, means for driving at least one of said auxiliary wheels whereby said frame and said carriage may be moved transversely across said strip, said discs cutting a transversely extending kerf therein during such movement.

4. Cutting apparatus for forming a plurality of longitudinally spaced transversely extending kerfs in an elongate strip of pavement, comprising: a frame; main wheels mounted by said frame and normally engaged with said pavement in order that said frame may be moved in a longitudinal direction therealong; a carriage mounted by said frame; a plurality of aligned, transversely spaced cutter discs rotatably mounted by said carriage, said discs normally being disposed out of engagement with said pavement; internal combustion engine means for rotating said discs; throttle means for controlling the speed of said engine means, said throttle means normally being disposed in an idling position; auxiliary wheels mounted by said carriage permitting it to be moved transversely relative to said strip, said auxiliary wheels normally being disposed above said pavement; means for effecting relative vertical separation of said frame and said carriage in order that said auxiliary wheels and said discs will be brought into engagement with said pavement and said main wheels will be lifted off of said pavement; means interposed between said frame and said carriage and responsive to the relative vertical position thereof for automatically advancing said throttle means before said discs are engaged with said pavement; and, means for driving at least one of said auxiliary wheels whereby said frame and said carriage may be moved transversely across said strip, said discs cutting a transversely extending kerf therein during such movement.

5. Cutting apparatus for forming a plurality of longitudinally spaced transversely extending kerfs in an elongate strip of pavement, comprising: a frame; main wheels mounted by said frame and normally engaged with said pavement in order that said frame may be moved in a longitudinal direction therealong; a carriage mounted by said frame; a plurality of aligned, transversely spaced cutter discs rotatably mounted by said carriage, said discs normally being disposed out of engagement with said pavement; power-operated means for rotating said discs; auxiliary wheels mounted by said carriage permitting it to be moved transversely relative to said strip, said auxiliary wheels normally being disposed above said pavement; means for supplying a coolant to said discs including normally closed valve means; means for effecting relative vertical separation of said frame and said carriage in order that said auxiliary wheels and said discs may be brought into engagement with said pavement and said main wheels will be lifted off of said pavement; means responsive to the relative vertical position of said frame and said carriage for controlling the speed of said power-operated means; means interposed between said frame and said carriage responsive to the relative vertical position thereof for automatically opening said valve means shortly before said discs are engaged with said pavement; and, means for driving at least one of said auxiliary wheels whereby said frame and said carriage may be moved transversely across said strip, said discs cutting a transversely extending kerf therein during such movement.

6. Cutting apparatus for forming a plurality of longitudinally spaced transversely extending kerfs in an elongate strip of pavement, comprising: a frame; main wheels mounted by said frame and normally engaged with said pavement in order that said frame may be moved in a longitudinal direction therealong; a carriage mounted by said frame; a plurality of aligned, transversely spaced cutter discs rotatably mounted by said carriage, said discs normally being disposed out of engagement with said pavement; internal combustion engine means for rotating said discs; throttle means for controlling the speed of said engine means, said throttle means normally being disposed in an idling position; auxiliary wheels mounted by said carriage permitting it to be moved transversely relative to said strip, said auxiliary wheels normally being disposed above said pavement; means for effecting relative vertical separation of said frame and said carriage, in order that said auxiliary wheels and said discs will be brought into engagement with said pavement and said main wheels will be lifted off of said pavement; means interposed between said frame and said carriage and responsive to the relative vertical position thereof for automatically advancing said throttle means before said discs are engaged with said pavement; means for supplying a coolant to said discs, including normally closed valve means; means interposed between said frame and said carriage responsive to the relative vertical position thereof for automatically opening said valve means before said discs are engaged with said pavement; and, means for driving at least one of said auxiliary wheels whereby said frame and said carriage may be moved transversely across said strip, said discs cutting a transversely extending kerf therein during such movement.

7. Cutting apparatus for forming a plurality of longitudinally spaced transversely extending kerfs in an elongated strip of pavement, comprising: a frame; main wheels mounted by said frame and normally engaged with said pavement in order that said frame may be moved in a longitudinal direction therealong; a carriage mounted by said frame; a plurality of aligned, transversely spaced cutter discs rotatably mounted by said carriage, said discs normally being disposed out of engagement with said pavement; auxiliary wheels mounted by said carriage permitting it to be moved transversely relative to said strip; a cylinder and piston interposed between said frame and said carriage for effecting relative vertical movement therebetween in order that said auxiliary wheels and said cutter discs may be brought into engagement with said pavement and said main wheels will be lifted off said pavement; a source of pressure fluid; conduit means connecting said source and said cylinder; valve means for controlling the rate of flow of said pressure fluid through said conduit means, said valve means normally permitting a free flow of said pressure fluid; and, means interposed between said frame and said carriage for causing said valve means to restrict the flow of pressure fluid through said conduit means when said carriage is being lowered and said cutter discs approach the surface of said pavement whereby the speed at which said carriage is being lowered is reduced as said discs cut into said pavement.

8. Cutting apparatus for forming a plurality of longitudinally spaced transversely extending kerfs in an elongate strip of pavement, comprising: a frame member; main wheels mounted by said frame member and normally engaged with said pavement in order that said frame member may be moved in a longitudinal direction therealong; a carriage member mounted by said frame member; a plurality of transversely spaced aligned cutter discs rotatably mounted by said carriage member, said discs normally being disposed out of engagement with said pavement; power-operated means for rotating said discs; auxiliary wheels mounted by said carriage member permitting it to be moved transversely relative to said strip, said auxiliary wheels normally being disposed above said pavement; a cylinder secured to one of said members; a piston slidably disposed within said cylinder and connected to the other of said members; a pump having an inlet and an outlet; a fluid reservoir connected to said inlet; a main controller valve; a supply conduit connecting said outlet with said main controller valve; a return conduit connecting said main controller valve with said reservoir; a first conduit connecting said main controller valve to one end of said cylinder; a second conduit connecting said main controller valve to the opposite end of said cylinder; a cam-operated throttling valve mounted by said carriage member and disposed in said second conduit, said throttling valve normally being fully open; an orifice valve by-passing said throttling valve; a check valve by-passing said throttling valve; and, a cam plate mounted by said frame member, relative vertical movement between said members being effected by the introduction of said fluid from said outlet into either end of said cylinder, fluid disposed in the opposite end of said cylinder being forced therefrom through said return conduit to said reservoir, and said cam plate being aligned with said throttling valve whereby they will be engaged when said cutter discs are in the vicinity of said pavement, such engagement causing said throttling valve to restrict the rate of flow of said fluid through said second conduit whereby the speed at which said carriage is being lowered is reduced as said discs cut into said pavement, and with said auxiliary wheels engaging said pavement after said cutter discs have been lowered thereinto whereafter said main wheels are lifted off said pavement.

9. Cutting apparatus for forming a plurality of longitudinally spaced transversely extending kerfs in an elongate strip of pavement, comprising: a frame; main wheels mounted by said frame and normally engaged with said pavement in order that said frame may be moved in a longitudinal direction therealong; a carriage mounted by said frame; a plurality of aligned, transversely spaced cutter discs rotatably mounted by said carriage, said discs normally being disposed out of engagement with said pavement; power-operated means for rotating said discs; auxiliary wheels mounted by said carriage permitting it to be moved transversely relative to said strip, said auxiliary wheels normally being disposed above said pavement; cylinder and piston means interposed between said frame and said carriage for effecting relative vertical movement therebetween in order that said auxiliary wheels and said cutter discs may be brought into engagement with said pavement and said main wheels will be lifted off said pavement; a source of pressure fluid; conduit means connecting said source and said cylinder; valve means for controlling the rate of flow of said pressure fluid through said conduit means, said valve means normally permitting a free flow of said pressure fluid; means interposed between said frame and said carriage for causing said valve means to restrict the flow of pressure fluid through said conduit means when said carriage is being lowered and said cutter discs approach the surface of said pavement whereby the speed at which said carriage is being lowered is reduced as said discs cut into said pavement; means responsive to the relative vertical position of said frame and said carriage for controlling the speed of said power-operated means; and means for driving at least one of said auxiliary wheels whereby said frame and said carriage may be moved transversely across said strip, said discs cutting a transversely extending kerf therein during such movement.

10. Cutting apparatus for forming a plurality of longitudinally spaced transversely extending kerfs in an elongate strip of pavement, comprising: a frame member; main wheels mounted by said frame member and normally engaged with said pavement in order that said frame member may be moved in a longitudinal direction therealong; a carriage member mounted by said frame; a plurality of aligned, transversely spaced cutter discs rotatably mounted by said carriage member, said discs normally being disposed out of engagement with said pavement; power-operated means for rotating said discs; auxiliary wheels mounted by said carriage member permitting it to be moved transversely relative to said strip, said auxiliary wheels normally being disposed above said pavement; a cylinder secured to one of said members; a piston slidably disposed within said cylinder and connected to the other of said members; a pump having an inlet and an outlet; a fluid reservoir connected to said inlet; a main controller valve; a supply conduit connecting said outlet with said main controller valve; a return conduit connecting said main controller valve with said reservoir; a first conduit connecting said main controller valve to the end of said cylinder; a second conduit connecting said main controller valve to the opposite end of said cylinder; a cam-operated throttling valve mounted by said carriage member and disposed in said second conduit, said throttling valve normally being fully open; an orifice valve by-passing said throttling valve; a check valve by-passing said throttling valve; a cam plate mounted by said frame member, relative vertical movement between said members being effected by the introduction of said fluid from said outlet into either end of said cylinder, fluid disposed in the opposite end of said cylinder being forced therefrom through said return conduit to said reservoir, and said cam plate being aligned with said throttling valve whereby they will be engaged when said cutter discs are in the vicinity of said pavement, such engagement causing said throttling valve to restrict the rate of flow of said fluid through said second conduit whereby the speed at which said carriage is being lowered is reduced as said discs cut into said pavement, and with said auxiliary wheels engaging said pavement after said cutter discs have been lowered thereinto whereafter said main wheels are lifted off said pavement; means responsive to the relative vertical position of said frame member and said carriage member for controlling the speed of said power-operated means; and means for driving at least one of said auxiliary wheels whereby said frame member and said carriage member may be moved transversely across said strip, said discs cutting a transversely extending kerf therein during such movement.

11. Cutting apparatus for forming a plurality of longitudinally spaced transversely extending kerfs in an elongate strip of pavement, comprising: a frame member; main wheels mounted by said frame member and normally engaged with said pavement in order that said frame member may be moved in a longitudinal direction therealong; a carriage member mounted by said frame member; a plurality of aligned, transversely spaced cutter discs rotatably mounted by said carriage member, said discs normally being disposed out of engagement with said pavement; internal combustion engine means for rotating said discs; throttle means for controlling the speed of said engine means, said throttle means normally being disposed in an idling position; auxiliary wheels mounted by said carriage member permitting it to be moved transversely relative to said strip, said auxiliary wheels normally being disposed above said pavement; cylinder and piston means interposed between said frame member and said carriage member for effecting relative vertical movement therebetween in order that said auxiliary wheels and said cutter discs may be brought into engagement with said pavement and said main wheels will be lifted off said pavement; a source of pressure fluid; conduit means connecting said source and said cylinder; valve means for controlling the rate of flow of said pressure fluid through said conduit means, said valve means normally permitting a free flow of said pressure fluid; means interposed between said frame member and said carriage member for causing said valve means to restrict the flow of pressure fluid through said conduit means when said carriage member is being lowered and said cutter discs approach the surface of said pavement whereby the speed at which said carriage member is being lowered is reduced as said discs cut into said pavement; means interposed between said frame member and said carriage member and responsive to the relative vertical position thereof for automatically advancing the throttle means before said discs are engaged with said pavement; and means for driving at least one of said auxiliary wheels whereby said frame member and said carriage member may be moved transversely across said strip, said discs cutting a transversely extending kerf therein during such movement.

12. Cutting apparatus for forming a plurality of longitudinally spaced transversely extending kerfs in an elongate strip of pavement, comprising: a frame member; main wheels mounted by said frame member and normally engaged with said pavement in order that said frame member may be moved in a longitudinal direction therealong; a carriage member mounted by said frame member; a plurality of aligned, transversely spaced cutter discs rotatably mounted by said carriage member, said discs normally being disposed out of engagement with said pavement; internal combustion engine means for rotating said discs; throttle means for controlling the speed of said engine means, said throttle means normally being disposed in an idling position; auxiliary wheels mounted by said carriage member permitting it to be moved transversely relative to said strip, said auxiliary wheels normally being disposed above said pavement; a cylinder secured to one of said members; a piston slidably disposed within said cylinder and connected to the other of said members; a pump having an inlet and an outlet; a fluid reservoir connected to said inlet; a main controller valve; a supply conduit connecting said outlet with said main controller valve; a return conduit connecting said main controller valve with said reservoir; a first conduit connecting said main controller valve to one end of said cylinder; a second conduit connecting said main controller valve to the opposite end of said cylinder; a cam-operated throttling valve mounted by said carriage member and disposed in said second conduit, said throttling valve normally being fully open; an orifice valve by-passing said throttling valve; a check valve by-passing said throttling valve; a cam plate mounted by said frame member, relative vertical movement between said members being effected by the introduction of said fluid from said outlet into either end of said cylinder, fluid disposed in the opposite end of said cylinder being forced therefrom through said return conduit to said reservoir, and said cam plate being aligned with said throttling valve whereby they will be engaged when said cutter discs are in the vicinity of said pavement, such engagement causing said throttling valve to restrict the rate of flow of said fluid through said second conduit whereby the speed at which said carriage member is being lowered is reduced as said discs cut into said pavement, and with said auxiliary wheels engaging said pavement after said cutter discs have been lowered thereinto whereafter said main wheels are lifted off said pavement; means interposed between said frame member and said carriage member and responsive to the relative vertical position thereof for automatic advancing said throttle means before said discs are engaged with said pavement; and means for driving at least one of said auxiliary wheels whereby said frame member and said carriage member may be moved transversely across said strip, said discs cutting a transversely extending kerf therein during such movement.

13. Cutting apparatus for forming a plurality of longitudinally spaced transversely extending kerfs in an elongate strip of pavement, comprising: a frame; main wheels mounted by said frame and normally engaged with said pavement in order that said frame may be moved in a longitudinal direction therealong; a carriage mounted by said frame; a plurality of aligned, transversely spaced cutter discs rotatably mounted by said carriage, said discs normally being disposed out of engagement with said pavement; power-operated means for rotating said discs; auxiliary wheels mounted by said carriage permitting it to be moved transversely relative to said strip, said auxiliary wheels normally being disposed above said pavement; means for supplying a coolant to said discs, including normally closed first valve means; cylinder and piston means interposed between said frame, and said carriage for effecting relative vertical movement therebetween in order that said auxiliary wheels and said cutter discs may be brought into engagement with said pavement and said main wheels will be lifted off said pavement; a source of pressure fluid; conduit means connecting said source and said cylinder; second valve means for controlling the rate of flow of said pressure fluid through said conduit means, said valve means normally permitting a free flow of said pressure fluid; means interposed between said frame and said carriage for causing said second valve means to restrict the flow of pressure fluid through said conduit means when said carriage is being lowered and said cutter discs approach the surface of said pavement whereby the speed at which said carriage is being lowered is reduced as said discs cut into said pavement; means responsive to the relative vertical position of said frame and said carriage for controlling the speed of said power-operated means; means interposed between said frame and said carriage responsive to the relative vertical position thereof for automatically opening said first valve means shortly before said discs are engaged with said pavement; and means for driving at least one of said auxiliary wheels whereby said frame and said carriage may be moved transversely across said strip, said discs cutting a transversely extending kerf therein during such movement.

References Cited in the file of this patent

UNITED STATES PATENTS

| | | |
|---|---|---|
| 689,064 | Butler et al. | Dec. 17, 1901 |
| 1,071,776 | Morrissey | Sept. 2, 1913 |
| 1,302,917 | Hairgrove | May 6, 1919 |
| 1,733,062 | Hove | Oct. 22, 1929 |
| 1,738,646 | Graves | Dec. 10, 1929 |
| 2,000,553 | Alden | May 7, 1935 |
| 2,140,838 | Hart | Dec. 20, 1938 |
| 2,195,108 | Graff | Mar. 26, 1940 |
| 2,243,405 | Wine | May 27, 1941 |
| 2,311,891 | Tyson | Feb. 23, 1943 |
| 2,365,267 | Hememann | Dec. 19, 1944 |
| 2,400,237 | Kylon et al. | May 14, 1946 |
| 2,502,043 | Howard | Mar. 28, 1950 |
| 2,506,076 | Garrison | May 2, 1950 |
| 2,657,596 | De Armas | Nov. 3, 1953 |
| 2,751,205 | Peterson | June 19, 1956 |
| 2,782,017 | Lewis | Feb. 19, 1957 |
| 2,791,412 | Hatcher | May 7, 1957 |